H. D. MORTON.

ARC WELDING SYSTEM AND METHOD OF OPERATING THE SAME.

APPLICATION FILED JAN. 25, 1922.

15,313.

Reissued Mar. 21, 1922.

Inventor

Harry D. Morton

By his Attorneys

Gibbard & Bull

UNITED STATES PATENT OFFICE.

HARRY D. MORTON, OF DETROIT, MICHIGAN, ASSIGNOR TO AUTOMATIC ARC WELDING COMPANY, OF DETROIT, MICHIGAN, A CORPORATION OF MICHIGAN.

ARC-WELDING SYSTEM AND METHOD OF OPERATING THE SAME.

15,313. Specification of Reissued Letters Patent. Reissued Mar. 21, 1922.

Original No. 1,392,437, dated October 4, 1921, Serial No. 264,930, filed December 2, 1918. Application for reissue filed January 25, 1922. Serial No. 531,828.

*To all whom it may concern:*

Be it known that I, HARRY D. MORTON, a citizen of the United States, residing at Detroit, in the county of Wayne and State of Michigan, have invented certain new and useful Improvements in Arc-Welding Systems and Methods of Operating the Same, of which the following is a specification.

My invention relates to electric arc welding, and more particularly to automatic and semi-automatic apparatus for this purpose and to the method of operating the same.

Figure 1:
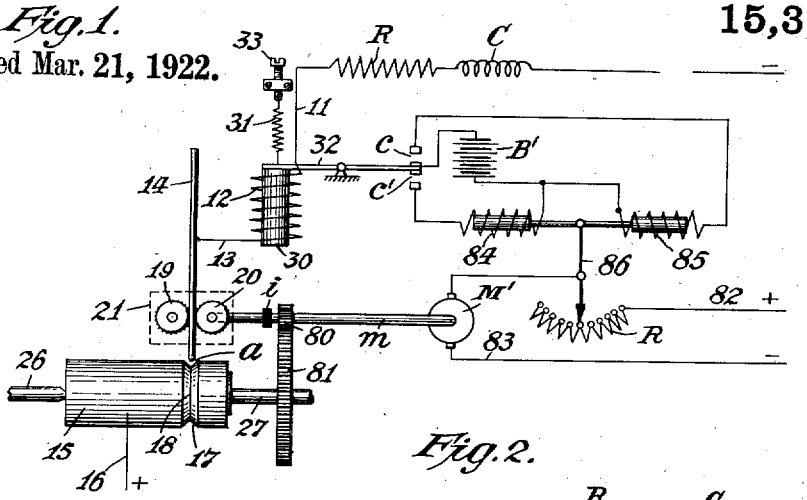
Figure 2:
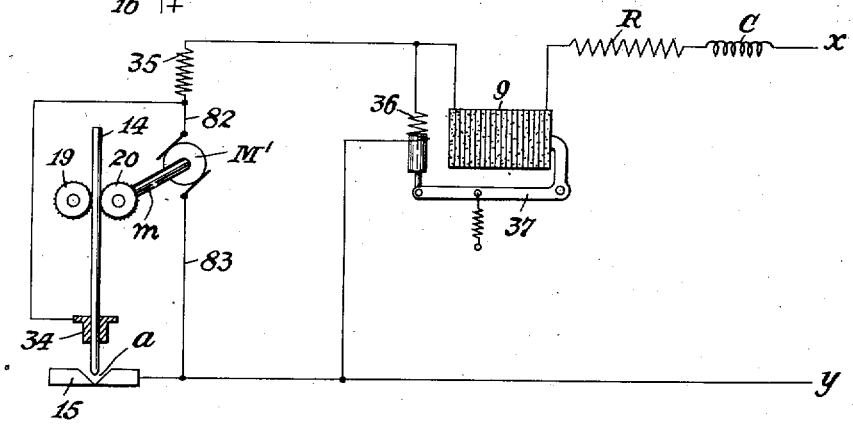
Figure 3:
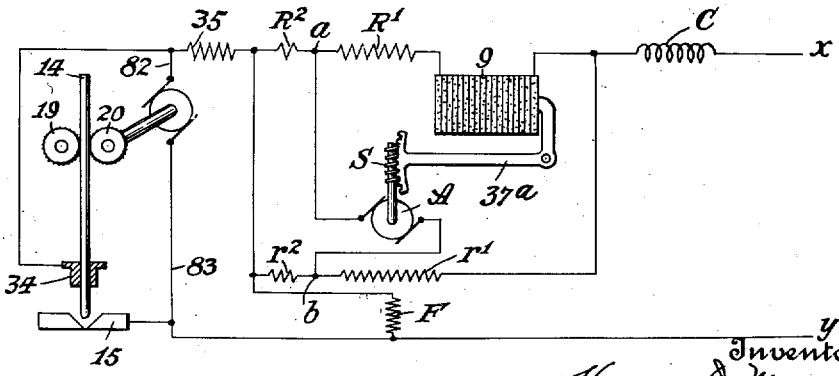

In the drawings, Fig. 1 is a diagrammatic view showing one form of my invention, in which the ballistic resistance which is used in the welding circuit may have either a substantially zero temperature co-efficient in which no compensatory adjustment is required, or in which the ballistic resistance has a substantial temperature co-efficient, in which case manually operated compensatory means are used; Fig. 2 is a diagrammatic view illustrating automatic compensatory means for the ballistic resistance, and Fig. 3 is also a diagrammatic view showing another form of automatic compensatory means for the ballistic resistance.

Referring to Fig. 1, current is supplied to the welding circuit from a generator or other suitable source of current, not shown, the circuit including the wire 11, solenoid 12, wire 13, welding strip 14, work 15, and return wire 16. It will be understood that in the welding operation an arc is formed at *a* between the end of the welding strip and the groove 17 in the work 15. For the purpose of welding two plates or parts together, the ends to be joined are tapered and placed in abutting relation, thereby forming the groove 17; and the intense heat of the arc at *a* rapidly melts the metallic strip 14 and this molten metal is deposited in the groove 17, thereby uniting the pieces of metal at the joint 18. On account of the fact that the intense heat at the arc *a* melts the strip 14 rapidly, it is necessary to feed this strip from a reel to the arc uninterruptedly and automatically to produce a homogeneous weld.

The feeding mechanism for feeding the metallic welding strip 14 to the work 15 consists of two feed rollers 19 and 20, preferably provided with serrated perimeters located to receive between them the welding strip 14, which is in the form of a wire. The feed rolls 19 and 20 are rotatably mounted in a welding head 21, which is indicated in dotted lines, and provided with suitable guides for the welding strip 14. The work 15 in the present case consists of two cylindrical members which are to be joined by an annular weld, and in order to do this the work is rotated while the welding strip 14 is being fed to the arc at *a* and while the molten metal formed is being deposited in the groove 17. The cylindrical members constituting the work 15 are rotatively supported in any suitable manner, as by the center 26 and a mandrel 27. The mandrel 27 is connected by the gear 81 to a gear 80 keyed to the motor shaft *m*. It will be seen that by this arrangement the motor shaft *m* drives the feed rolls 19 and 20 and also produces a relative movement between the work and the welding head while the strip 14 is being fed to the work and the molten metal is being deposited on the work. It will also be noted that the feed rolls are driven at a higher speed than the work, since the ratio of the gears 80 and 81 is about as 1 to 7. A fixed relation is preserved between the feed of the welding strip 14 and the rate of movement of the work 15, but the feed of the welding strip 14 is varied because the welding strip cannot be made uniform throughout its entire length. Different portions of the welding strip may vary in fusibility or be of slightly differing diameters and the strip will, therefore, fuse at different rates. When the welding strip 14 fuses very rapidly there is a danger that the arc at *a* may suddenly become so long as to rupture and then in order to start the arc it is necessary to bring the end of the strip 14 again into contact with the work. Conversely, if the feed of the strip 14 to the arc *a* is more rapid than the fusion of the welding strip, the welding strip may be fed against the work and cause a short circuit, which is injurious to the work and also requires separating the electrodes to again form an arc.

I have found that under normal conditions an equilibrium is maintained by the arc itself, which has, within certain limits, if the welding strip is continuously fed at a suitable constant rate, a compensatory action, as follows: When the arc shortens the resistance decreases, the amperage rises, and this rise in amperage results in the welding strip fusing more rapidly, thereby causing the arc to lengthen. Conversely, if the arc lengthens the resistance is increased, the amperage decreases proportionately, the welding strip is fused more slowly, and the continuously moving welding strip restores the arc to its normal length. However, in order to take care of the extreme differences of fusibility of the welding strip 14 and thereby maintain the arc, I have devised an automatic control mechanism which is responsive to the changes in the energy at the arc *a* and which will alter the rate of feed of the welding strip 14 to correct the variations of the arc and thus compensate for the differences in fusibility of the feeding strip. As appears from the description of my device, its effect is to accentuate the self-compensatory action of the arc. In the device here shown, the motor M′, which is supplied with current from a source independent of the welding circuit, drives through the shaft *m* the welding strip feed roll 20 and through gears 80, 81, the mandrel 27 supporting the work 15. In series with the armature of this motor M′ is the rheostat R. The arm 86 of this rheostat is connected to the armatures of the coils 84, 85. These coils 84, 85 receive their current from an independent source, such as the battery B′. In the local circuit are the two switches *c*, *c*. These switches are operated by the movable switch member 32 attached to the armature 30 of the control solenoid 12 in series with the arc. The operation of the device is as follows: The arc is struck by first moving the welding strip 14 into contact with the work 15 and then separating the same therefrom manually, or in any other well known manner. Thereafter the welding strip is continuously fed toward the work during the welding process. In the event of the arc becoming too short, the solenoid 12 becomes more strongly energized and its armature 30 overcomes the tension of the opposing spring 31, causing the movable switch member 32 to engage with the stationary contact member *c*, thereby establishing a local circuit from the battery B′ through the solenoid 85 and moving the rheostat arm 86 in a direction to cut in additional resistance in the resistance member R. The amount of current in the armature of the motor M′ is thereby reduced and the speed of the motor correspondingly decreased. This reduction in the rate of feed in the welding strip 14 results in the welding strip being fused more rapidly than it is fed and the arc is quickly restored to its normal length. Conversely, if, during the welding process, the arc becomes unduly long, the pull of solenoid 12 is correspondingly decreased and the tension of the opposing spring 31 overcomes the solenoid pull, causing the movable switch member 32 to engage the stationary contact *c*′ and thereby close the local circuit from the battery B′ through the solenoid 84 and move the rheostat arm 86 in a direction to cut out some of the resistance in the rheostat R. The amount of current in the armature of the motor M′ is thereby increased, the speed of the motor is correspondingly accelerated, thus causing the welding strip 14 to be fed more rapidly than it is fused, and restoring the arc to its normal length.

Whatever arc-maintaining mechanism may be employed, the adjustment must be accurately made. For example, I have found that where a ballistic resistance is used which has a relatively high temperature co-efficient of resistance, the fusing energy available at the arc varies materially with the temperature of this ballistic resistance R. When R is cold and its resistance is low, a relatively high fusing energy is available at the arc. Conversely, as R becomes heated and its resistance increases materially, a corresponding reduction occurs in the fusing energy available at the arc. Assume that spring 31 is so adjusted that when the resistance R is at a temperature of 300° F., there is available at the arc such an amount of fusing energy as to result in a substantially normal equilibrium between the feeding rate of the welding strip 14 and the fusing rate of said welding strip. Under these conditions, if the arc shortens unduly, the low-speed switch *c* will become operative and the arc length will be restored to normal in the manner hereinbefore described. Should the arc lengthen unduly, the high-speed switch *c*′ will become operative, with a similar result. The corrective means will remain operative to maintain the arc so long as the supply of fusing energy available at the arc is not interfered with. When, however, the temperature of the resistance R reaches, say 600° F., the supply of fusing energy available at the arc will have been materially reduced, with a corresponding reduction in the normal pull of solenoid 12, and a consequent tendency on the part of spring 31 to keep the high speed switch *c*′ closed. The motor will thus tend to run at a high rate of speed and, therefore, tend to bring the welding strip in contact with the work, and thus produce a condition the opposite of that which is desired. Conversely, as the resistance R cools—as, for example, when the machine is shut down—the amount of fusing energy available at the arc is materially increased, with a corresponding increase in the normal pull of solenoid 12, and a consequent tendency on the part of this solenoid to overcome the tension of spring 31 and keep the low speed switch closed. The motor will thus tend to run at a lower rate of speed and, therefore, tend to allow the arc to become so long as to rupture, thus bringing about a condition the opposite of that which is desired. In order to overcome the difficulties referred to, I have provided an adjusting means, here shown as a screw 33, by which the tension of the spring 31 may be varied.

I have found that it is inconvenient to obtain a stability of adjustment by the means shown in Fig. 1, as it is often necessary to change the adjustment from time to time during the day, and from day to day.

I have discovered that one cause of this difficulty is variation in the resistance of the welding circuit. I have found that if the stabilizing means, such as resistance R and reactance C, is one whose effect is considerably different when hot from that exerted when cold, a single adjustment of screw 33 will not suffice. It is, therefore, highly desirable that the resistance R should be one having a low temperature resistance co-efficient. I have found the low temperature co-efficient alloys now on the market satisfactory. Any means, however, for rendering the resistance substantially constant in its effect may be employed to permit a substantially constant adjustment.

In referring to "a stabilizing means constant in effect" I intend to imply such substantial or approximate constancy of resistance as will permit of constancy of adjustment. It might in some cases, for example, be possible to do this without employing a so-called zero co-efficient material, by using ordinary resistance grids having a normal carrying capacity so much greater than the welding current that the temperature would not vary greatly, or artificial cooling might be resorted to, to attain the same end by maintaining a constant temperature.

In many instances approximate compensation for temperature changes may be secured by the use of a resistance having a positive temperature co-efficient in series with an electrolyte or other form of resistance having a negative temperature co-efficient. An automatic means of varying the amount of resistance in circuit so as to maintain in effect a constant potential across the welding machine and work is also within the meaning and intent of my description. In Fig. 2 I have shown such an arrangement. In this figure, $x$ and $y$, are the two terminals of the source, 15 is the work, 14 the welding strip, 9 a variable resistance, shown as a carbon pile, R a resistance and C a reactance. The welding strip 14 is shown digrammatically as fed forward by wheels 19 and 20, one of which is rotated by an electric motor M′ whose armature is in shunt to the arc and whose field winding 35 is in series therewith. The variable resistance 9 is sufficient in magnitude so that, under the control of magnet 36 shunted across the circuit inside of the resistance and reactance stabilizing means, it is able to maintain a substantially constant potential across the arc. This resistance is shown as a carbon pile rheostat controlled by lever in response to the magnet 36 acting against the weight of the lever 37.

In Fig. 3 I have shown an automatically self-compensating resistance which may be employed. In this figure $r_1$, $R_2$ and $r_2$ are resistances having approximately zero temperature co-efficients, and $R_1$, which constitutes the major part of the stabilizing resistance, may be any convenient resistance, such as a cast iron grid, iron wire or water rheostat. A small variable resistance, indicated as a carbon pile rheostat 9, is part of the branch containing $R_1$. Resistances $r_1$ and $r_2$ may be of very small current carrying capacity, and hence inexpensive. The resistances are so proportioned that at normal temperature there is no difference of potential between the points $a$ and $b$ when current is flowing. The points $a$ and $b$ are connected to the armature A of a small motor, which by worm and sector S actuate lever 37ᵃ of carbon pile rheostat 9. The field magnet F of this motor is connected in shunt to the circuit as shown. Its connection is immaterial, as it is only necessary that there should be a field, and its particular strength is immaterial.

Should a change occur in the resistance $R_1$ a difference of potential will occur between points $a$ and $b$, and a current will flow through the armature A whose direction will depend upon whether an increase or a decrease in resistance $R_1$ has occurred. The armature will thereupon rotate to vary resistance 9 to restore the total resistance in circuit to normal. Any other suitable variable resistance means may be employed. All of the foregoing means, and others which will suggest themselves, I intend to include as stabilizing means constant in effect.

Another source of varying circuit resistance seems to be the varying resistance of the welding strip itself as the result of the heating effect of the welding current and of the arc. It will be observed that the welding strip in the device herein shown, for purposes of illustration, is carried by a suitable guide 34 and feeding rolls 19 and 20. The current is carried to the electrode chiefly by the lower guide or holder 34. I have found that it is very desirable for the maintenance of a stable arc, and in commercial use practically indispensable for the best results, that the electrode holder of an arc welding machine having automatic electrode feeding and arc maintaining means, should be as close as possible to the arc. The reason for this is not entirely clear, but I have found from much experience that if the electrode holder is a considerable distance from the arc, the arc becomes unstable and difficult to control. For example, in a particular automatic machine, developed and built by me, I have found that with a current of 140 amperes an electrode of iron or steel wire $\frac{3}{32}$ inch in diameter, fed at a speed of about 16 inches a minute through a holder, such as 3, reaching to within $\frac{1}{2}$ to $\frac{5}{8}$ inch of the arc, the operation is stable as long as the machine is kept in operation. If, however, this distance is materially increased in said machine, the length of time that the arc continues stable decreases, and if the distance is as great as 2 or $2\frac{1}{2}$ inches the arc is stable only for a few seconds after the machine is started.

It may be that this effect is purely mechanical and the result of vibration resulting from the feeding forward of the electrode strip. I have observed that this condition of instability accompanies the extension backward from the arc of the incandescence of the electrode and that the correct distance is to be determined in view of the diameter of the wire, the current carried, and the speed at which the wire is fed. This leads me to believe that the sudden increase of resistance of the wire as it reaches the temperature of recalescence, and the extension backward of such a temperature to too great a distance, is the cause of this instability. However this may be, the fact is unquestionably established by my experience, and I have discovered that the difficulty can be overcome by supporting and conveying the current to the electrode at a point close to the arc, and that unless this lower electrode holder is brought down rather near the arc, continuous stable operation is very difficult to secure.

It is advantageous to have this electrode guide of sufficient current carrying capacity to avoid its being greatly heated by the current which it carries, and of good heat conducting material. A wire or rod $\frac{3}{32}$ of an inch in diameter would be melted in a short time by a current of about 90 amperes, and one of $\frac{1}{8}$ diameter by a current of about 140 amperes, and, in general, the current employed in welding is large enough to soon melt or raise to high incandescence the electrode used if the latter were stationary. Inasmuch as the wire is fed continuously forward, it does not melt except at the arc, even with continuous welding, and by taking the current to the electrode near to the arc the heating to incandescence, with its attendant extreme changes in resistance, is confined to a short length of the electrode. The changes of resistance are, therefore, a small percentage of the total resistance and do not result in instability. It will be seen, therefore, that the continuous feed and the point of support at which the current is taken to the electrode are features intimately related to the stability of the arc.

The lower electrode holder is preferably made adjustable to and from the work in any well known or convenient manner, in order that the most advantageous distance from the arc may be attained for any particular circumstances of use.

While I have shown means for steadily feeding the electrode toward the work, and prefer such means, I do not limit myself thereto, as the intermittent feeding of the electrode by short increments at frequent intervals may be substituted for the steady feed and by the expression "continuously feeding," as used in my claims, I intend to include either a steady feed or an intermittent feed sufficiently rapid to be equivalent thereto.

What I claim and desire to secure by Letters Patent of the United States, is:—

1. In a welding apparatus, a welding tool, a welding circuit, and a stabilizing means constant in its effect included in said welding circuit.

2. In a welding apparatus, a welding tool, a welding circuit, and a stabilizing resistance whose resistance is independent of its temperature included in said welding circuit.

3. In a welding apparatus, a welding tool, a welding circuit, and a stabilizing means comprising a reactance and a resistance, said resistance being constant in its effect included in said welding circuit.

4. In a metallic electrode arc welding apparatus, a welding tool having means for feeding the electrode toward the work, a welding circuit, and a stabilizing means constant in its effect included in said welding circuit.

5. In a welding apparatus, means for feeding a welding strip toward the work, means for supplying electrical energy to the arc, and means responsive to variations in the resistance of the welding circuit external to the arc for correctively varying the rate of feed of said strip.

6. In a metallic electrode arc welding apparatus, means for feeding a welding strip toward the work, means for supplying electrical energy to the arc, stabilizing means in the welding circuit, and means associated with the stabilizing means for accentuating the self-compensatory action of the arc.

7. In an arc welding apparatus, means for continuously feeding a metallic welding strip toward the work at a normal rate proportioned to the resistance of the welding circuit external to the arc, means for maintaining said proportion between the resistance of the circuit and the rate of feed, and means for controlling the relation between the fusing rate and the feeding rate of the welding strip to compensate for variations at the arc.

8. In a metallic electrode arc welding apparatus, a welding tool, a stabilizing resistance constant in its effect, and means for conveying current to the electrode at a point near the arc.

9. In a welding apparatus, a welding machine having automatic means for continuously feeding the electrode toward the work, and a stabilizing means whose effect is constant.

10. In a welding apparatus, a welding tool having automatic means for continuously feeding the electrode toward the work and for maintaining the arc, and a stabilizing resistance whose effect is independent of its temperature.

11. In a metallic electrode arc welding apparatus, a welding tool having automatic means for continuously feeding the electrode toward the work, a stabilizing resistance whose effect is independent of its temperature, and means for conveying current to the electrode at a point near the arc.

12. In a metallic electrode arc welding apparatus, a welding tool having automatic means for continuously feeding the electrode toward the work and for maintaining the arc, a stabilizing resistance whose effect is independent of its temperature, and means for conveying current to the electrode at a point near the arc.

13. The improvement in that process of electric arc welding wherein the arc is formed between the work and a metallic welding strip continuously fed toward the work, which consists in supplying the current to the welding strip always at a point near the arc through a stabilizing means constant in its effect.

14. The process of electric arc welding which consists in striking an arc between the work and a strip of metal constituting one electrode, stabilizing said arc by supplying current to a point on the strip near the arc through a stabilizing means constant in its effect, and maintaining said arc by feeding said electrode continuously and automatically toward the work.

15. In an electric arc welding apparatus, a welding tool having automatic means for continuously feeding the electrode toward the work and for maintaining the arc, and a stabilizing means constant in its effect.

16. In an electric arc welding apparatus, a constant potential source of current, a welding tool having automatic means for continuously feeding the electrode toward the work, means controlled by a variable characteristic of the arc for controlling the arc, and a stabilizing means constant in its effect.

17. In an electric arc welding apparatus, a constant potential source of current, a welding tool having automatic means for continuously feeding the electrode toward the work, means controlled by a variable characteristic of the arc for controlling the arc, a stabilizing means constant in its effect, and means for conveying current to the electrode at a point near the arc.

18. In an electric arc welding apparatus, a constant potential source of current, a welding tool having automatic means for continuously feeding the electrode toward the work, means controlled by a variable characteristic of the arc for controlling the arc, means for adjusting said means, a stabilizing means constant in its effect, and means for conveying current to the electrode at a point near the arc.

19. In a metallic electrode arc welding apparatus, the combination with a welding tool, having means for continuously feeding a welding strip toward the work, and means for supporting said strip at a point close to the arc, of an arc stabilizing means constant in its effect.

20. In a welding apparatus, a welding machine having automatic means for feeding the electrode toward the work, and a stabilizing means whose effect is constant.

21. In an electric arc welding apparatus, a circuit having a constant resistance for supplying current to the arc, means for automatically feeding a welding strip toward the work, and means for automatically controlling the relation between the feeding rate of the welding strip and the fusing energy of the arc.

22. The process of electric arc welding which consists in suplying current to the arc through a circuit having a constant resistance, automatically feeding a welding strip toward the work, and automatically controlling the relation between the feeding rate of the welding strip and the fusing energy of the arc.

23. In an electric arc welding apparatus, a circuit having a constant resistance for supplying current to the arc, and means for automatically feeding a welding strip toward the work.

24. In an electric arc welding apparatus, a circuit whose resistance external to the arc is constant for supplying current to the arc, and means for automatically feeding a welding strip toward the work.

25. The process of electric arc welding which consists in maintaining the resistance of the circuit external to the arc constant, and automatically feeding a welding strip toward the work.

26. The improvement in that method of arc welding wherein a metallic welding strip is automatically fed toward the work, which consists in maintaining the resistance of the circuit external to the arc constant throughout the welding operation.

27. The improvement in that method of arc welding wherein a metallic welding strip is automatically fed toward the work, which consists in maintaining stable the resistance of the welding circuit external to the arc and in utilizing changes in a characteristic of the arc to maintain the arc.

In testimony whereof I have hereunto signed my name in the presence of two subscribing witnesses.

HARRY D. MORTON.

Witnesses:
ADELE S. EBERHARDT,
DANN L. WOOD.